July 9, 1935.  H. E. MORSE  2,007,918
CONDUIT
Filed Oct. 27, 1932
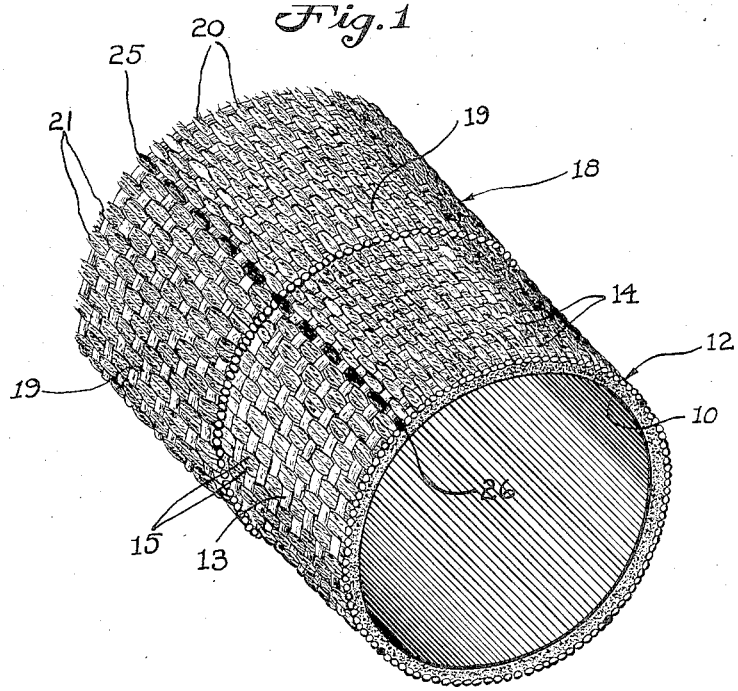
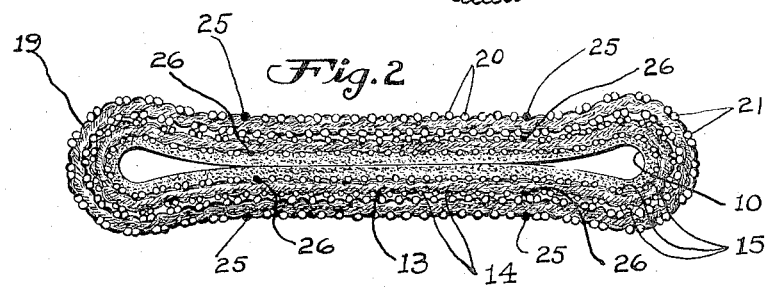
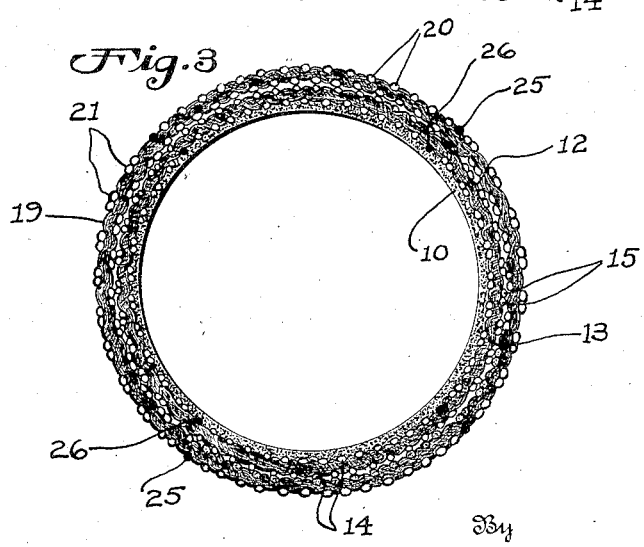
Inventor
Herman E. Morse
Attorney Patented July 9, 1935

2,007,918

UNITED STATES PATENT OFFICE 2,007,918

CONDUIT

Herman E. Morse, Akron, Ohio, assignor to Wingfoot Corporation, Akron, Ohio, a corporation of Delaware

Application October 27, 1932, Serial No. 639,805

4 Claims. (Cl. 137—90)

This invention relates to conduits and more particularly to flexible conduits having reinforcing means incorporated therewith.

Difficulty has been experienced heretofore in the manufacture and use of reinforced flexible conduits, for example jacketed fire hose. This is because when the hose is reeled upon drums or other supporting means, the hose should lie substantially flat and yet when used it should be substantially circular in cross-section. This difference in the shape of the hose when it is reeled and when it is being used has formed the basis for a considerable number of patented hose constructions. Substantially all the patented structures can be made only at extra expense and with considerable labor. In addition, the elaborate structures do not for the most part flatten completely as is desirable so that the greatest possible amount of hose can be wound on a given reel, and in certain constructions they do not flatten in the same place or along the same longitudinal areas as is desirable.

It is an object of the present invention to avoid and overcome the aforementioned difficulties by the provision of an improved flexible jacketed conduit or hose.

Another object of the invention is to provide an improved hose having an integral reinforcing means designed to insure the complete flattening of the hose along the proper areas.

Another object of the invention is to provide a fire hose having a woven jacket which has certain portions of the jacket designed to resist frictional wear and certain other areas of the jacket designed to readily allow the hose to be flattened to facilitate the reeling thereof.

The foregoing and other objects of the invention are achieved by the conduit illustrated in the accompanying drawing wherein:

Figure 1 is a perspective view of a section of a conduit embodying the invention;

Figure 2 is an end view showing the conduit in a flattened condition; and

Figure 3 is an end view showing the conduit in expanded condition.

Referring to the drawing, in which is illustrated one form of the present invention, the numeral 10 indicates a rubber tube or conduit which is ordinarily vulcanized to a surrounding woven jacket indicated generally by the numeral 12. The woven jacket 12 comprises one or more helically wound woof or weft cords 13 and longitudinally extending parallel warp cords 14 and 15.

As will be evident from an inspection of the drawing, the warp cords 14 alternately extend above and below the helically wound woof cords 13. As distinguished from this is the relation of the warp cords 15 with the helically wound woof cords 13. The cords 15 are paired together so that two warp cords run alternately above and below the helically wound woof cords. It has been found that the double end or double weave comprising the cords 15 and 13 provides a more flexible jacket than the single end or single weave of the cords 13 and 14. Thus, a single weave is employed for the top and bottom of the jacket to provide a frictional or wearing surface, while the double weave cords are employed in the side areas of the jacket to provide a more flexible casing for the hose at these points to allow the same to more readily flatten.

Hose built in accordance with the foregoing principles will be found to possess very desirable caracteristics in that the same can be quite readily flattened and coiled and at the same time the upper and lower surfaces of the hose are made so that they will be able to resist frictional wear in the best possible manner.

Any number of additional layers of rubber or woven jacket material can be applied over the rubber conduit 10 and jacket 12 as will be understood. For example, the particular embodiment of the invention illustrated in the drawing comprises a double jacketed hose in which the first jacket 12 is covered with an additional woven jacket 18. The woven jacket 18, like the woven jacket 10, comprises helically extending woof or weft cords 19 and longitudinally extending warp cords 20 and 21. The helical woof cords 19 and the longitudinal warp cords 20 alternately cross above and below each other to provide a single end weave which, as specified heretofore, is particularly adapted to resist frictional wear. On the other hand, the cords 19 and 21 are woven to provide a double end weave in that a pair of cords 21 alternately extend above and below the helical cords 19, whereby a more flexible jacket area is provided.

In the usual practice of applicant's invention the single and double woven areas of the jacket are separated by demarcating cords 25 and 26 which are preferably colored and which add an interesting appearance or effect to applicant's hose. These cords also serve in the capacity of facilitating the proper positioning and alignment of the respective areas of the jacket and the hose so that the hose will be flattened in the proper directions at all times.

It will be appreciated that the particular sizes of the helically wound woof or weft cords 13 and 19 and the sizes and strength of the longitudinally extending warp cords 20 and 21 and 14 and 15 can be widely varied as desired without departing from the principles of the present invention. In this respect the invention contemplates employing different sized longitudinally extending cords in the single woven and the double woven areas. Again the material employed in the double woven and single woven cords can be varied as found to be desirable without departing from the teachings of the invention.

While the features of the invention are particularly applicable to rubber hose reinforced with a cotton jacket, it will be apparent that the same can be employed in conjunction with flexible tubing of any character reinforced with substantially any strand medium. At the same time it will be recognized that the principles of the invention are applicable to conduit structures comprising substantially any relation of reinforcing means with any number of plastic or flexible interposed conduits.

For the foregoing reasons it will be appreciated that the embodiment of the invention illustrated in the drawing has been selected for purposes of illustration only and that the scope of the invention is defined in the appended claims.

What I claim is:

1. A conduit comprising a flexible tube having a smooth and continuous inner surface, a woven jacket reinforcing said tube, said jacket and tube compositely having a circular cross-section when in use, and said jacket including longitudinally extending elements and a helically wound element, the longitudinally extending elements alternately and singly passing above and below the helically wound element at the top and bottom areas of the conduit, said longitudinally extending elements being grouped together at the sidewall areas of the conduit and passing in alternate groups of two or more elements above and below the helically wound element.

2. A conduit comprising a flexible tube having a smooth and continuous inner surface, a woven jacket reinforcing said tube, said jacket and tube compositely having a circular cross-section when in use, and said jacket including longitudinally extending elements and a helically wound element, the longitudinally extending elements alternately and singly passing above and below the helically wound element at the top and bottom areas of the conduit, said longitudinally extending elements being grouped together at the sidewall areas of the conduit and passing in alternate groups of two or more elements above and below the helically wound element, and means forming a line of demarcation between the top-bottom areas and the sidewall areas of the conduit without affecting the contour of the conduit.

3. A conduit including a circular woven jacket and a circular rubber tube vulcanized within the jacket and presenting a smooth and continuous inner surface when in use, said jacket comprising longitudinal warp elements and circumferential woof elements, said warp elements being single ended in top-bottom areas of the conduit and double ended in sidewall areas of the conduit.

4. A conduit including a circular woven jacket and a circular rubber tube vulcanized within the jacket and presenting a smooth and continuous inner surface when in use, said jacket comprising longitudinal warp elements and circumferential woof elements, said warp elements being single ended in top-bottom areas of the conduit and double ended in sidewall areas of the conduit, and visible demarcation means separating the respective areas without affecting the contour of the conduit.

HERMAN E. MORSE.